(12) United States Patent
Maiterth et al.

(10) Patent No.: US 9,927,260 B2
(45) Date of Patent: Mar. 27, 2018

(54) MAGNETIC FIELD SENSOR ASSEMBLY FOR ASCERTAINING THE PATH OF A MOVING OBJECT

(71) Applicant: Robert Bosch GmbH, Stuttgart (DE)

(72) Inventors: Eduard Maiterth, Heilbronn (DE); Michael Kleinknecht, Lehrensteinsfeld (DE); Mathias Kimmerle, Steinheim (DE); Joerg Siedentopf, Untergruppenbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/128,791

(22) PCT Filed: Feb. 25, 2015

(86) PCT No.: PCT/EP2015/053902
§ 371 (c)(1),
(2) Date: Sep. 23, 2016

(87) PCT Pub. No.: WO2015/144377
PCT Pub. Date: Oct. 1, 2015

(65) Prior Publication Data
US 2017/0108354 A1    Apr. 20, 2017

(30) Foreign Application Priority Data
Mar. 26, 2014 (DE) .......... 10 2014 205 566

(51) Int. Cl.
*G01D 5/14* (2006.01)

(52) U.S. Cl.
CPC ............ *G01D 5/147* (2013.01); *G01D 5/145* (2013.01)

(58) Field of Classification Search
CPC ............................. G01D 5/147; G01D 5/145

USPC .......................................... 324/207.2–207.25
See application file for complete search history.

(56) References Cited

U.S. PATENT DOCUMENTS

2007/0229058 A1* 10/2007 Wolf .................. G01D 5/145
324/207.24

FOREIGN PATENT DOCUMENTS

| DE | 44 45 120 A1 | 6/1995 |
| DE | 102 13 508 A1 | 10/2002 |
| DE | 103 25 317 A1 | 2/2004 |
| DE | 10 2009 043 178 A1 | 3/2011 |
| DE | 10 2009 055 104 A1 | 6/2011 |
| JP | 50-110255 | 2/1949 |

(Continued)

OTHER PUBLICATIONS

International Search Report corresponding to PCT Application No. PCT/EP2015/053902, dated Jul. 21, 2015 (German and English language document) (5 pages).

*Primary Examiner* — Jay Patidar
(74) *Attorney, Agent, or Firm* — Maginot, Moore & Beck LLP

(57) ABSTRACT

A sensor assembly for ascertaining the path of a moved part includes a magnetic measuring assembly and a fixed sensitive measure element. The magnetic measuring assembly has a magnetic field with at least one spatial component that is changed by the movement of the part along the path to be ascertained. The position of the moved part is detected in relation to the fixed sensitive measuring element. The magnetic field is generated by at least one effective magnet connected to the moved part, and at least one support magnet arranged in a fixed manner in the measuring region of the sensitive measuring element.

7 Claims, 4 Drawing Sheets

(56) References Cited

FOREIGN PATENT DOCUMENTS

| JP | 2007-24738 A | 2/2007 |
|---|---|---|
| JP | 2010-197399 A | 9/2010 |
| JP | 2012-247298 A | 12/2012 |
| JP | 2013-83516 A | 5/2013 |
| JP | 2013-96723 A | 5/2013 |
| WO | 2013/127984 A1 | 9/2013 |

* cited by examiner

MAGNETIC FIELD SENSOR ASSEMBLY FOR ASCERTAINING THE PATH OF A MOVING OBJECT

This application is a 35 U.S.C. § 371 National Stage Application of PCT/EP2015/053902, filed on Feb. 25, 2015, which claims the benefit of priority to Serial No. DE 10 2014 205 566.0, filed on Mar. 26, 2014 in Germany, the disclosures of which are incorporated herein by reference in their entirety.

BACKGROUND

The disclosure is based on a sensor assembly for ascertaining the path of a moved component.

Rotational speed sensors and position sensors are known from the prior art and it is possible for said rotational speed sensors and position sensors to identify and evaluate a rotational movement or a change in position by means of ascertaining a corresponding change in a magnetic field. In general, known magnetic sensors are used that can be embodied depending upon their use and area of application as Hall sensors, AMR sensors, GMR sensors, TMR sensors or generally as xMR sensors and can be used by way of example for controlling motors or in transmission systems or driving dynamics systems in motor vehicles. In the case of the magnetic circuit design of such sensor assemblies for measuring the path and angle in a magnetic manner by means of ascertaining a change in the magnetic angle over the path or angle, it is necessary to fulfill requirements of the sensitive elements or evaluating components (ASICs) in relation to maintaining a defined flux density region. In order to be able to measure long paths (>20 mm) with a high degree of precision, generally at least two moving magnets are used when measuring the path or angle by means of ascertaining a change in a magnetic angle over the path or angle. These magnets provide a common magnetic field having as large as possible (<360°) a change in magnetic angle over the actuating path or an actuating angle and simultaneously a defined magnetic flux density. That means that it is necessary to integrate two relatively large magnets on the moving part of an application which is not always possible because of the available construction space or is only possible with complex and thereby expensive constructions and strong and thereby likewise expensive magnets.

It is essential for the sensitive measuring element in use to ascertain the revolving or rotating magnetic field vector. This revolving or rotating movement of the magnetic field vector is ascertained by means of the sensitive measuring element that can be part of an ASICs (application specific integrated circuit). This occurs by way of example in the case of a two-dimensional or three-dimensional Hall sensor by means of indirectly ascertaining the angle by way of an arc-tangent function of the magnetic flux density that is directed.

DE 10 2009 055 104 A1 discloses by way of example a magnetic field sensor assembly for ascertaining the path of moved components, in which spatial components of the magnetic field of a magnet system on the moved component change in their direction over the path that is to be ascertained and as a consequence it is possible to accordingly detect their position with respect to a fixed sensor. At least one magnet is located on the component that moves in a linear manner and in a further degree of freedom, said magnet being a component of the magnetic system or another magnetic component whose outer circumference is allocated in a predetermined spacing lying opposite at least one fixed sensor that is sensitive to the magnetic field direction, wherein the preferred direction of the magnetic field of the magnet is aligned in a predetermined angle with respect to the path between zero and 90° of the moved component.

SUMMARY

The sensor assembly in accordance with the disclosure for ascertaining the path of a moved component has in contrast the advantage that at least one small and thereby cost-effective magnet is arranged in the fixed part of the application or in the sensor housing, by way of example directly in the vicinity of the sensitive measuring element. The fixed magnetic circuit in the fixed part of the application can comprise one or multiple small magnets. Furthermore, large measuring regions that are embodied from a sensitive measuring region and from a fixed clamping region having at least one fixed magnet can be achieved by means of at least one smaller and thereby more cost-effective magnet on the movable component of the application in lieu of as previously by means of two essentially longer magnets on the movable part. Since smaller magnets are to be integrated onto the movable part, said magnets requiring less installation space than the conventional magnets, the integration of the at least one active magnet can be facilitated in an advantageous manner. The at least one fixed magnet acts as an auxiliary magnet and can likewise be designed as particularly small and thereby cost-effective since said active magnet can be attached particularly near to the sensitive measuring element. In the case of a sensitive measuring element that is assembled on a circuit board, the auxiliary magnet can likewise lie on the circuit board, by way of example adjacent to or on the opposite-lying circuit board face of the sensitive measuring element. Embodiments of the disclosure can be used in the case of all path sensors and/or angle sensors that evaluate the change in the magnetic flux direction such as by way of example Hall sensors, in particular so-called 2D or 3D Hall sensors or also xMR sensors, such as for example AMR or GMR sensors. In particular, sensitive measuring elements that measure the flux density in two or three spatial directions offer numerous possibilities by means of combining the magnetization direction of the magnet and the assembly of the at least one auxiliary magnet with respect to the at least one active magnet to fulfill the requirements of the sensitive measuring elements, such as by way of example 3D Hall sensors having at least one flux concentrator.

The movable at least one active magnet provides the rotation of the magnetic field vector at the site of the fixed sensitive measuring element and consequently the change in signal in the sensitive measuring region. The fixed at least one auxiliary magnet provides a fixed, non-rotating magnetic field vector and a sufficient flux density at the site of the fixed sensitive measuring element as soon as the at least one active magnet has moved too far from the fixed sensitive measuring element. The magnetic field that is generated by the fixed at least one auxiliary magnet and the non-rotating magnetic field vector can be used to generate a constant output signal in the fixed clamping region. The at least one auxiliary magnet is expediently aligned in such a manner that its magnetization direction at the moment when the at least one active magnet leaves the measuring region of the sensitive measuring element maintains the last measured magnetic field direction, in other words a constant measuring angle is provided that would not have been previously measured by means of the at least one active magnet during the course of the previous measuring process until the active magnet leaves the measuring region of the sensitive measuring element.

Embodiments of the present disclosure provide a sensor assembly for ascertaining the path of a moved component, wherein at least one spatial component of a magnetic field of a magnetic measuring assembly changes as a result of the component moving over the path that is to be ascertained and as a consequence it is possible to detect the position of the moved component in relation to a fixed sensitive measuring element. In accordance with the disclosure, at least one active magnet that is connected to the moved component, and at least one auxiliary magnet that is arranged in a fixed manner in the measuring region of the sensitive measuring element generate the magnetic field.

Advantageous further improvements of the sensor assembly for ascertaining the path of a moved component according to the disclosure are possible by means of the measures and further developments that are disclosed in the dependent claims.

It is particularly advantageous that the at least one fixed auxiliary magnet generates a constant fixed first magnetic field vector at the site of the sensitive measuring element. The constant fixed first magnetic field vector of the fixed at least one auxiliary magnet can comprise a predetermined angle in relation to a normal of the measuring surface of the sensitive measuring element at the site of the sensitive measuring element.

In one advantageous embodiment of the sensor assembly in accordance with the disclosure, the movable at least one active magnet can generate a rotating second magnetic field vector when entering the measuring region of the sensitive measuring element at the site of the sensitive measuring element and the magnetic field of said magnetic field vector is superposed onto the magnetic field of the at least one auxiliary magnet. It is possible to connect multiple active magnets or only one active magnet to the moved component so as to generate the rotating second magnetic field vector at the site of the sensitive measuring element. When using multiple active magnets, said active magnets can be embodied as smaller than an individual active magnet in order to generate the rotating second magnetic field vector at the site of the sensitive measuring element. The available construction space on the moved component can be optimally used and the desired second magnetic field vector can be generated by means of a tailored distribution of the smaller active magnets to suit the application.

In a further advantageous embodiment of the sensor assembly in accordance with the disclosure, the magnetizations of the at least one active magnet and of the at least one auxiliary magnet can comprise a predetermined angle with respect to one another. A predetermined angular range of the magnetic field vectors in relation to a normal of the measuring surface of the sensitive measuring element can be predetermined at the site of the sensitive measuring element by means of the predetermined magnetization directions of the magnet so that the magnetic circuit of the sensor assembly can be tailored in a simple manner by means of the arbitrary magnetization angle to suit various applications and/or installation spaces.

In a further advantageous embodiment of the sensor assembly in accordance with the disclosure, the sensitive measuring element can be arranged on a circuit board that comprises a first surface and a second surface. The fixed at least one auxiliary magnet can thus be arranged by way of example on the same surface of the circuit board adjacent to the sensitive measuring element or on another surface of the circuit board below or adjacent to the sensitive measuring element or in a via of the circuit board. In order to be able to embody the at least one auxiliary magnet as small as possible, the at least one auxiliary magnet is preferably arranged as near as possible to the sensitive measuring element, in other words with as small as possible a spacing with respect to the sensitive measuring element. When using multiple auxiliary magnets, it is possible to combine the possible arrangement positions of the individual auxiliary magnets. At the site of the sensitive measuring element, it is possible to predetermine the angle of the fixed magnetic field vector in relation to the normal of the measured surface of the sensitive measuring element in an advantageous and simple manner by means of selecting the position of the at least one auxiliary magnet with respect to the sensitive measuring element. The direction of the auxiliary magnetic field is selected to suit the site of the auxiliary magnet and to suit the magnetization of the movable at least one active magnet. In addition, the fixed auxiliary magnet can be assembled together with a ferromagnetic flux conducting piece.

In a further advantageous embodiment of the sensor assembly in accordance with the disclosure, the sensitive measuring element can be embodied as part of an evaluating component. The evaluating component is preferably embodied as an ASIC (application specific integrated circuit).

In a further advantageous embodiment of the sensor assembly in accordance with the disclosure, the path that is to be ascertained can represent a translational movement or a rotational movement.

Exemplary embodiments of the disclosure are illustrated in the drawings and are further explained in the description hereinunder. In the drawings, identical reference numerals refer to components or elements that perform identical or similar functions.

DETAILED DESCRIPTION

Figure 1:
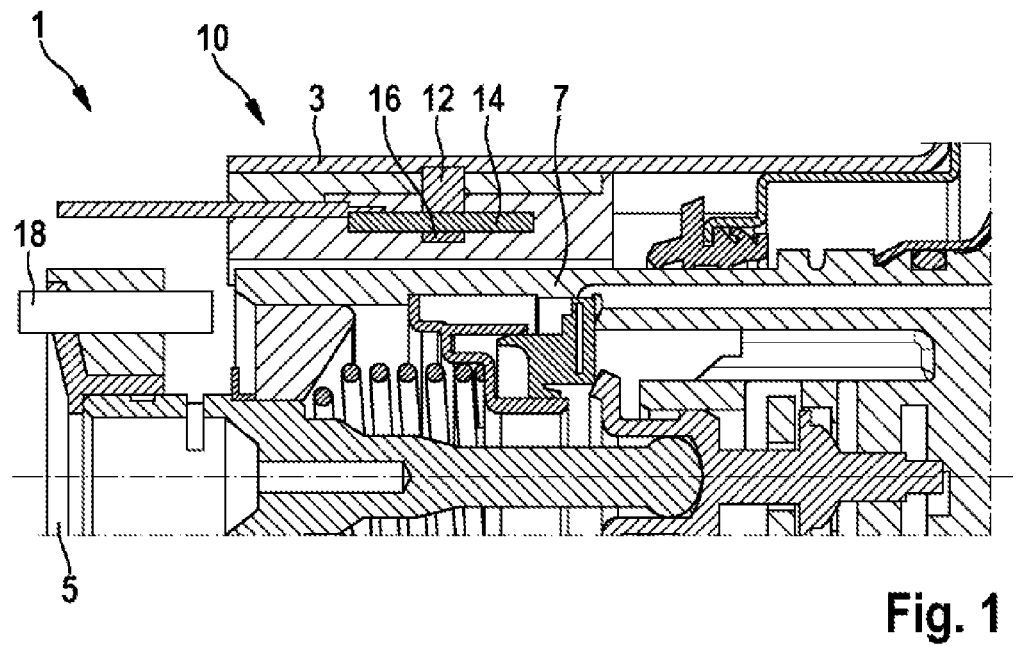
FIG. 1 illustrates a schematic sectional view of an exemplary embodiment of a sensor assembly in accordance with the disclosure for ascertaining the path of a moved component.
Figure 2:
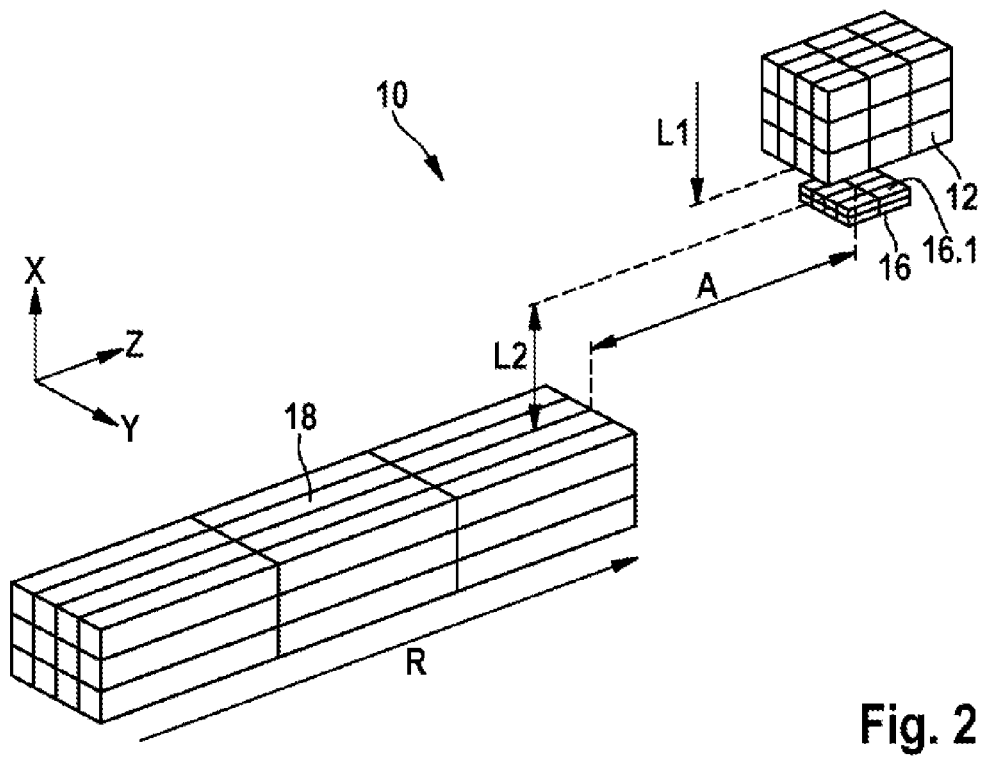
FIG. 2 illustrates a schematic perspective view of the individual components of the magnetic measuring assembly for the sensor assembly in accordance with the disclosure for ascertaining the path of a moved component in FIG. 1.

As is evident in FIG. 1 and FIG. 2, the illustrated exemplary embodiment comprises a sensor assembly 1 in accordance with the disclosure for ascertaining the path of a moved component 5, a magnetic measuring assembly 10, wherein at least one spatial component of a magnetic field of the magnetic measuring assembly 10 changes as a result of the component 5 moving over the path R that is to be ascertained and as a consequence it is possible to detect the position of the moved component 5 in relation to a fixed sensitive measuring element 16.1. In accordance with the disclosure at least one active magnet 18 that is connected to the moved component 5, and at least one auxiliary magnet 12 that is arranged in the measuring region of the sensitive measuring element 16.1 in such a manner that it cannot move generate the magnetic field.

In the illustrated exemplary embodiment, the moved component 5 represents a moved piston that by way of example is moved in a translational manner in a cylinder of a braking force booster by means of actuating a brake pedal. As is further evident in FIG. 1, the at least one auxiliary magnet 12 and an evaluating component that is embodied by way of example as an ASIC are arranged on a circuit board 14 in such a manner that said evaluating component 16 cannot move, said evaluating component being fastened to a housing 3 of the braking force booster. As is further evident in FIG. 2, the sensitive measuring element 16.1 is embodied as part of the evaluating component 16.

The fixed at least one auxiliary magnet 12 generates a constant fixed first magnetic field vector at the site of the sensitive measuring element 16.1. In addition, the constant fixed first magnetic field vector of the fixed at least one auxiliary magnet 12 comprises at the site of the sensitive measuring element 16.1 a predetermined angle in relation to a normal of the measuring surface of the sensitive measuring element 16.1. The intensity or length of the magnetic field vector is dependent upon the spacing L1 between the auxiliary magnet 12 and the sensitive measuring element 16.1.

As is further evident in FIG. 2, the movable at least one active magnet 18 generates a rotating second magnetic field vector when entering the measuring region of the sensitive measuring element 16.1 at the site of the sensitive measuring element 16.1 and the magnetic field of said magnetic field vector is superimposed onto the magnetic field of the at least one auxiliary magnet 12. The measuring region of the sensitive measuring element 16.1 is represented in FIG. 2 by means of a spacing A. The intensity or prevailing length of the rotating magnetic field vector of the moved at least one active magnet 18 at the site of the fixed sensitive measuring element 16.1 is dependent upon the spacing with respect to the sensitive measuring element 16.1. The maximum length of the rotating magnetic field vector is dependent upon the air gap L2 between the at least one active magnet 18 and the sensitive measuring element 16.1.

The magnetizations of the at least one active magnet 18 and the at least one auxiliary magnet 12 comprise a predetermined angle with respect to one another so that they can be adapted to suit various applications and/or installation spaces.

Figure 3:
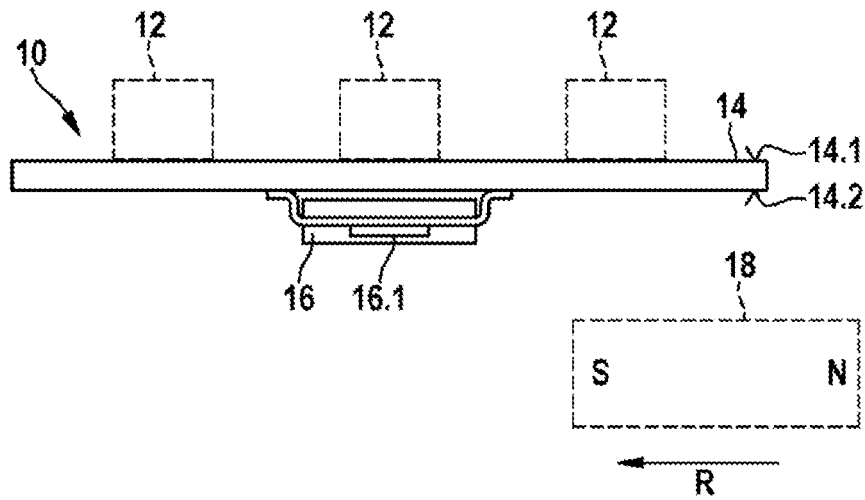
FIG. 3 illustrates a side view of the magnetic measuring assembly for illustrating various positions for arranging an auxiliary magnet for the magnetic measuring assembly.
Figure 4:
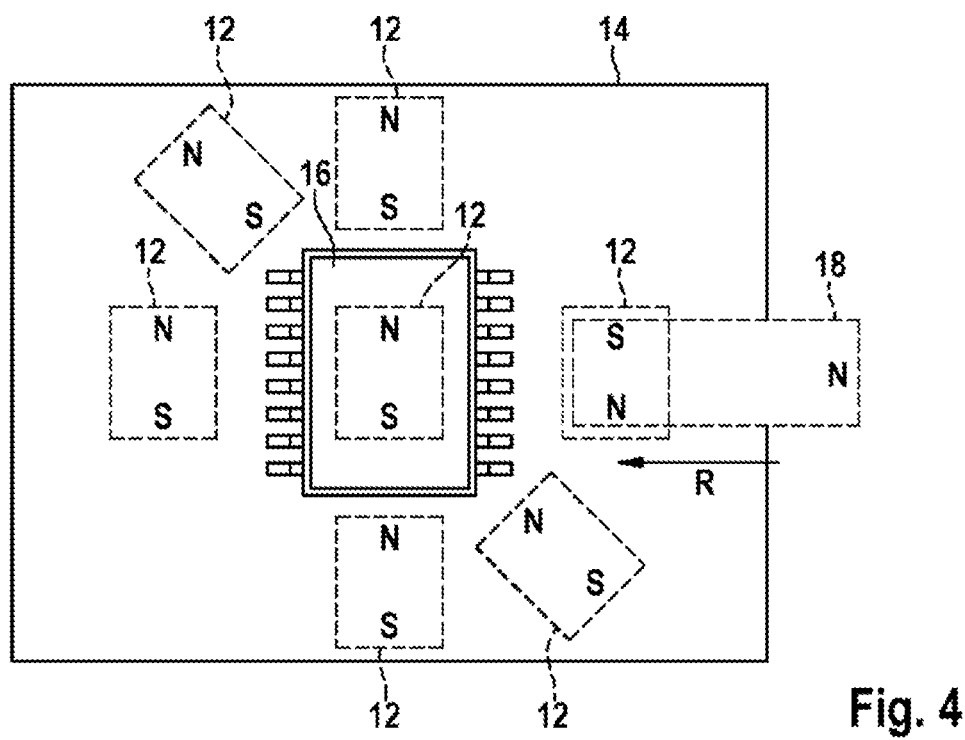
FIG. 4 illustrates a plan view of the magnetic measuring assembly in FIG. 3.

As is evident in FIGS. 3 and 4, the fixed at least one auxiliary magnet 12 and the sensitive measuring element 16.1 can be arranged on various surfaces 14.1, 14.2 of the circuit board 14. It is possible to predetermine at the site of the sensitive measuring element 16.1 the angle of the fixed magnetic field vector in relation to the normal of the measuring surface of the sensitive measuring element 16.1 in an advantageous and simple manner by means of selecting the position of the at least one auxiliary magnet 12 with respect to the sensitive measuring element 16.1 and by means of the magnetization direction of the at least one auxiliary magnet 12. FIGS. 3 and 4 illustrate various possible positions for arranging the auxiliary magnet 12 that are illustrated by the dashed line. The auxiliary magnet can thus be arranged by way of example directly above the sensitive measuring element 16.1 or at a predetermined angle having various spacings with respect to the sensitive measuring element 16.1. Alternatively, the auxiliary magnet 12 can be arranged in the case of a not illustrated embodiment on the same surface 14.1 or 14.2 of the circuit board 14 adjacent to the sensitive measuring element 16.1 or in a via of the circuit board 14. In order to be able to embody the at least one auxiliary magnet 12 as small as possible, the at least one auxiliary magnet 12 is arranged preferably as near as possible to the sensitive measuring element 16.1, in other words with as small as possible a spacing with respect to the sensitive measuring element 16.1.

As is further evident in FIG. 3, the movable at least one active magnet 18 in the illustrated exemplary embodiment is magnetized from the right-hand side (N) to the left-hand side (S), in other words the north pole N is arranged on the right-hand side and the south pole S is arranged on the left-hand side, wherein only one active magnet 18 is used in the illustrated exemplary embodiment. Alternatively, multiple active magnets 18 having magnetization directions that are coordinated with one another and positions on the moved component 5 can be used in order to generate the rotating second magnetic field vector at the site of the sensitive measuring element 16.1. The at least one active magnet 18 can thus also comprise by way of example a magnetization direction in the illustration from the top to the bottom, in other words north pole N at the top, south pole S at the bottom or from the bottom to the top, in other words south pole at the top, north pole N at the bottom. In addition, the at least one active magnet 18 can also comprise an inclined magnetization direction. A magnetization direction is not indicated for the at least one auxiliary magnet 12. Various magnetization directions can be predetermined for the at least one auxiliary magnet 12 in dependence upon the position of the at least one auxiliary magnet 12 and the magnetization of the movable at least one active magnet 18. The at least one auxiliary magnet 12 can thus be magnetized by way of example in the same direction as the at least one active magnet 18, in other words from the right-hand side to the left-hand side. Alternatively, a magnetization direction from the top to the bottom, in other words the north pole N at the top, south pole S at the bottom or from the bottom to the top, in other words the south pole at the top, north pole N at the bottom is also feasible for the at least one auxiliary magnet 12. In addition, the at least one auxiliary magnet 12 can comprise an inclined magnetization direction. The magnetization direction of the at least one auxiliary magnet 12 and of the active magnet 18 render it possible to likewise predetermine the direction of the corresponding magnetic field vectors at the site of the sensitive measuring element 16.1. The magnetization directions of the auxiliary magnet 12 are illustrated in FIG. 4 in an exemplary manner. Naturally, other magnetization directions can also be predetermined.

Figure 5:
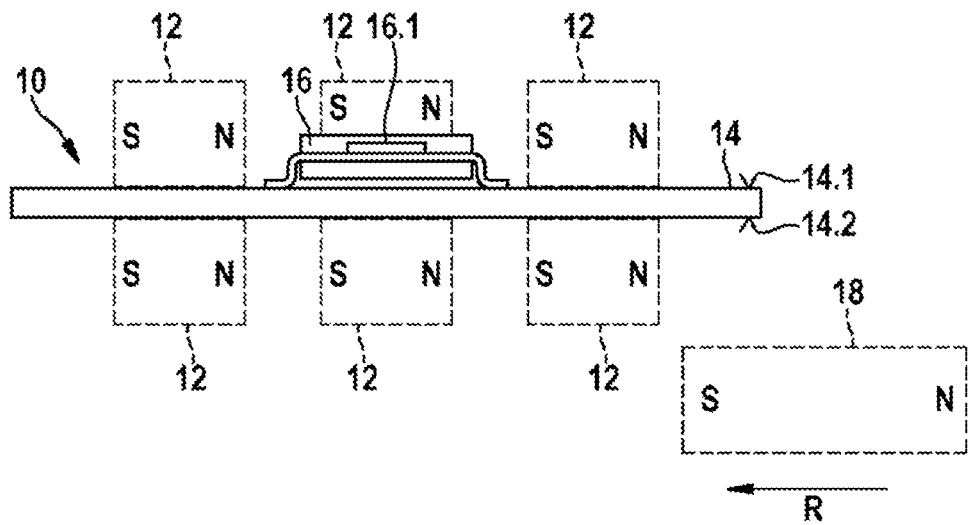
FIG. 5 illustrates a side view of the magnetic measuring assembly for illustrating further positions for arranging an auxiliary magnet for the magnetic measuring assembly.
Figure 6:
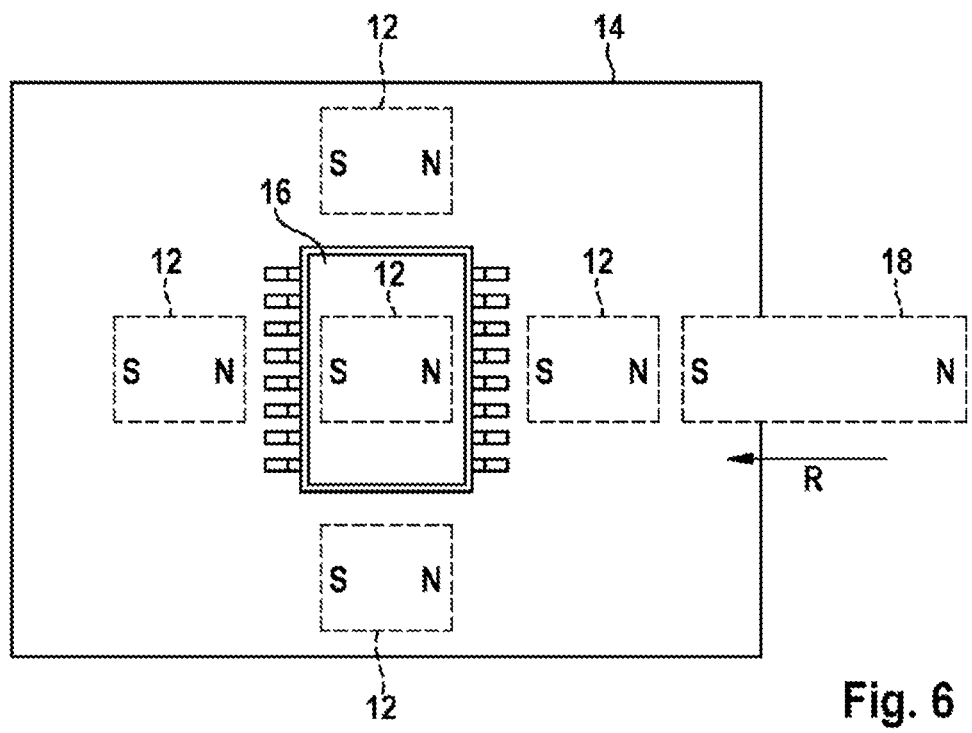
FIG. 6 illustrates a plan view of the magnetic measuring assembly in FIG. 5.

As is evident in FIGS. 5 and 6, the fixed auxiliary magnet 12 can be arranged both on the same surface 14.1 of the circuit board 14 as the sensitive measuring element 16.1 as well as on another surface 14.2 of the circuit board 14. Even in the case of this embodiment, it is possible in a simple manner to predetermine the angle of the fixed magnetic field vector in relation to the normal of the measuring surface of the sensitive measuring element 16.1 at the site of the sensitive measuring element 16.1 by means of selecting the position of the at least one auxiliary magnet 12 with respect to the sensitive measuring element 16.1 by means of the magnetization direction of the at least one auxiliary magnet 12. FIGS. 5 and 6 illustrate various possible positions for arranging the at least one auxiliary magnet 12 that are illustrated by the dashed line. As described above, it is possible to predetermine arbitrary magnetization directions for the at least one auxiliary magnet 12 or the at least one active magnet 18, wherein the magnetization directions of the auxiliary magnet 12 and the active magnet 18 are only illustrated in FIGS. 5 and 6 in an exemplary manner.

Figure 7:
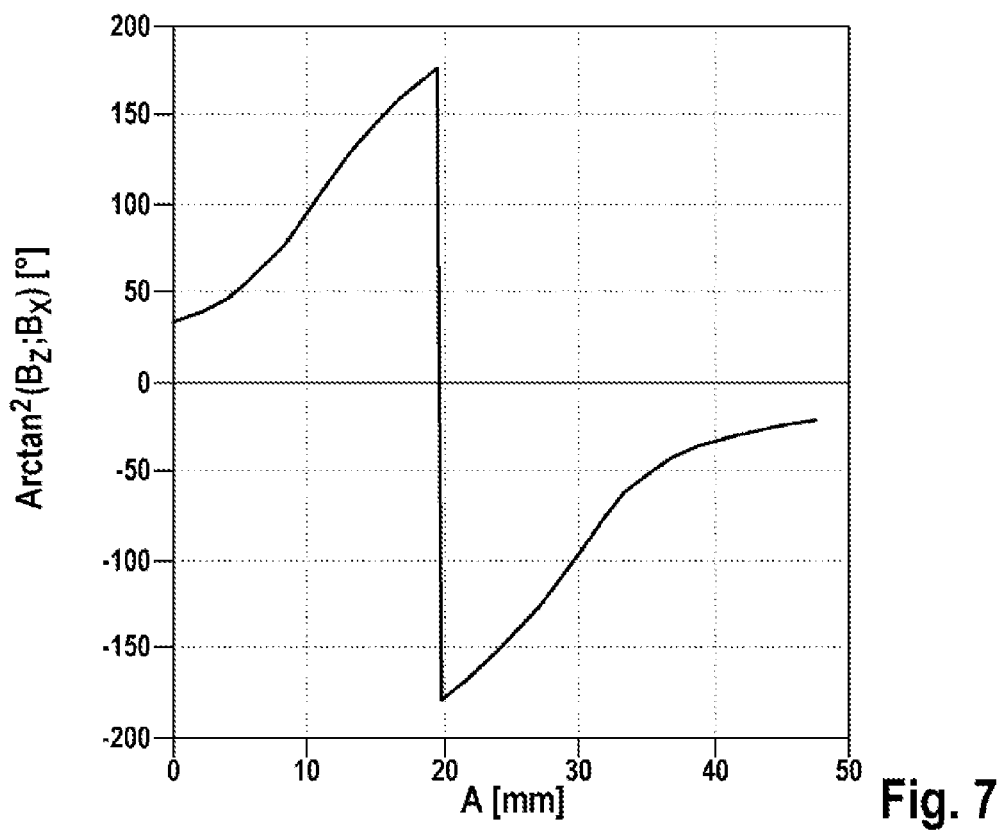
FIGS. 7 and 8 illustrate in each case a characteristic curve of the magnetic measuring assembly in FIG. 2.
Figure 8:
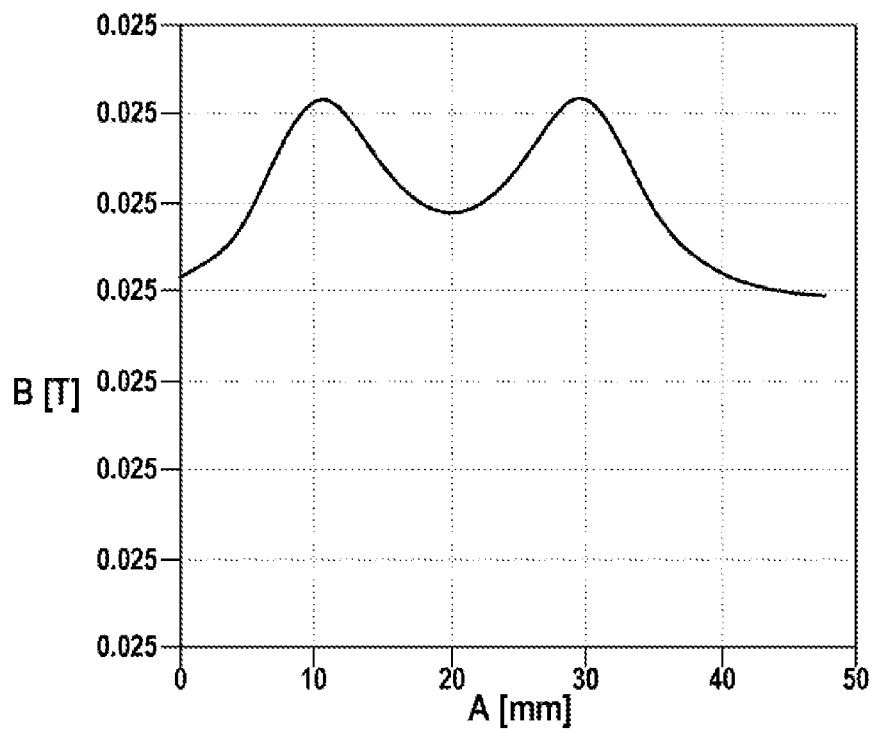

As is evident in the characteristic curves of FIGS. 7 and 8, the movable at least one active magnet 18 creates the opportunity for the magnetic field vector to rotate at the site of the fixed sensitive measuring element 16.1 and consequently for the signal to change in the measuring region A of the sensitive measuring element 16.1. The fixed at least one auxiliary magnet 18 provides a fixed, non-rotating magnetic field vector and a sufficient flux density as soon as the at least one active magnet 18 has moved too far from the site of the fixed sensitive measuring element 16.1. The constant magnetic field vector is used to generate a constant output signal in the fixed clamping region. The at least one auxiliary magnet 12 is aligned in an advantageous manner in such a manner that its magnetization direction at the moment when the active magnet 18 leaves the measuring region A of the sensitive measuring element 16.1 maintains the last measured magnetic field direction, in other words a constant measuring angle is provided that would previously not have been measured during the course of the previous measuring process until the active magnet leaves the measuring region A of the sensitive measuring element 16.1.

In the case of the illustrated exemplary embodiments, the path R that is to be ascertained corresponds to a translational movement of the moved component 3. Alternatively, embodiments of the sensor assembly 1 in accordance with the disclosure for ascertaining the path of a moved component 5 can also be used to ascertain a rotational movement.

The invention claimed is:

1. A sensor assembly for ascertaining the path of a moving component, comprising:
    a magnetic measuring assembly having a magnetic field with at least one spatial component that changes as a result of the moving component moving over the path that is to be ascertained; and
    a fixed sensitive measuring element, the position of the moving component detected in relation to the fixed sensitive measuring element,
    wherein the magnetic field is generated by (i) at least one active magnet that is connected to the moving component and (ii) at least one auxiliary magnet that is arranged in a fixed manner in a measuring region of the sensitive measuring element,
    wherein the auxiliary magnet generates a constant fixed first magnetic field vector at the site of the sensitive measuring element and the active magnet generates a rotating second magnetic field vector when entering into the measuring region of the sensitive measuring element at the site of the sensitive measuring element,
    wherein the rotating second magnetic field vector of the active magnet is superposed on the constant fixed first magnet field vector of the auxiliary magnet when the active magnet is in the measuring region of the sensitive measuring element, and
    wherein the auxiliary magnet is oriented such that a magnetization direction of the auxiliary magnet at the moment when the active magnet leaves the measuring region of the sensitive measuring element maintains a last measured magnetic field direction.

2. The sensor assembly as claimed in claim 1, wherein the constant fixed first magnetic field vector of the fixed at least one auxiliary magnet comprises a predetermined angle in relation to a normal of a measuring surface of the sensitive measuring element at the site of the sensitive measuring element.

3. The sensor assembly as claimed in claim 1, wherein the magnetizations of the at least one active magnet and the at least one auxiliary magnet comprise a predetermined angle with respect to one another.

4. The sensor assembly as claimed in claim 1, wherein the sensitive measuring element is arranged on a circuit board that comprises a first surface and a second surface.

5. The sensor assembly as claimed in claim 4, wherein the sensitive measuring element is arranged on the first surface, and wherein the fixed at least one auxiliary magnet is arranged on the first surface of the circuit board adjacent to the sensitive measuring element or on the second surface of the circuit board directly below the sensitive measuring element or on the second surface of the circuit board below and adjacent to the sensitive measuring element.

6. The sensor assembly as claimed in claim 1, wherein the sensitive measuring element is configured as a part of an evaluating component.

7. The sensor assembly as claimed in claim 1, wherein the path that is to be ascertained represents a translational movement or a rotational movement.

* * * * *